(12) United States Patent
Harrity et al.

(10) Patent No.: US 7,240,810 B2
(45) Date of Patent: Jul. 10, 2007

(54) FLEXIBLE SUPPLY TUBE WITH WEIGHTING MECHANISM FOR USE IN SPRAY BOTTLES

(75) Inventors: Kevin Harrity, Oak Creek, WI (US); Timothy R. Bartlett, Racine, WI (US); William L. Driskell, Lee'Summit, MO (US)

(73) Assignee: S.C. Johnson & Son, Inc., Racine, WI (US)

( * ) Notice: Subject to any disclaimer, the term of this patent is extended or adjusted under 35 U.S.C. 154(b) by 294 days.

(21) Appl. No.: 10/653,964

(22) Filed: Sep. 4, 2003

(65) Prior Publication Data

US 2004/0089674 A1 May 13, 2004

Related U.S. Application Data (60) Provisional application No. 60/424,688, filed on Nov. 8, 2002.

(51) Int. Cl.
*B67D 5/60* (2006.01)

(52) U.S. Cl. .................................................. 222/464.4
(58) Field of Classification Search ................. 222/382, 222/464.4, 464.1; 24/459
See application file for complete search history.

(56) References Cited

U.S. PATENT DOCUMENTS

| | | |
|---|---|---|
| 751,329 A | 2/1904 | McLaughlin et al. |
| 973,532 A | 10/1910 | McLaughlin et al. |
| 1,695,263 A | 12/1928 | Jacques |
| 1,887,013 A | 11/1932 | Coffield |
| 1,959,102 A | 5/1934 | Hummel |
| 2,128,494 A | 8/1938 | Morrow |
| 2,372,678 A | 4/1945 | McKay |
| 2,530,583 A | 11/1950 | Nurkiewicz |
| 2,811,390 A | 10/1957 | Kiraly |
| 3,088,680 A | 5/1963 | Fulton et al. |
| 3,229,998 A | 1/1966 | Pennington |
| 3,490,656 A | 1/1970 | Taschner |
| 3,547,296 A | 12/1970 | Greenberg |
| 3,580,430 A | 5/1971 | Angele |
| 3,667,655 A | 6/1972 | Knieriem, Jr. |
| 3,724,882 A | 4/1973 | Dehar |
| 3,757,031 A * | 9/1973 | Izraeli .......................... 24/459 |
| 4,118,838 A | 10/1978 | Schiefer et al. |

(Continued)

FOREIGN PATENT DOCUMENTS

| | | |
|---|---|---|
| EP | 0 285 040 | 10/1988 |
| EP | 0 976 418 | 2/2000 |
| FR | 2 700 483 | 7/1994 |
| GB | 735659 | 8/1955 |
| GB | 2 128 668 | 5/1984 |
| GB | 2 136 057 | 12/1984 |
| JP | 61-39111 | 2/1986 |
| JP | 07-096982 | 4/1995 |
| JP | 07-101479 | 4/1995 |
| JP | 08-183576 | 7/1996 |
| JP | 11-180481 | 7/1999 |
| WO | WO 00/53527 | 9/2000 |

*Primary Examiner*—Philippe Derakshani (57) ABSTRACT

A spray bottle having a pump, flexible tubing, a housing and a retainer for clamping the tubing to the housing. The pump pumps fluid to be sprayed from inside the spray bottle. The flexible tubing is attached to the pump, extends into the spray bottle, and communicates fluid from inside the spray bottle to the pump. The housing is attached to a distal end of the flexible tubing and includes a head, a weight and a nozzle. The head projects into an opening in the distal end of the tubing. The weight is secured in the housing. The nozzle extends from an end of the housing opposing the end of the housing attached to the head. An opening in the nozzle and an opening in the head are in flow communication. The retainer encircles a portion of a periphery of the tubing and clamps the tubing against the head.

17 Claims, 10 Drawing Sheets

U.S. PATENT DOCUMENTS

| | | | |
|---|---|---|---|
| 4,273,272 A | 6/1981 | Blanc | |
| 4,278,279 A | 7/1981 | Zimmerman | |
| 4,750,764 A | 6/1988 | Gibellina | |
| 4,771,516 A | 9/1988 | Foth | |
| 4,830,235 A | 5/1989 | Miller | |
| 4,903,995 A | 2/1990 | Blenkush et al. | |
| 4,946,200 A | 8/1990 | Blenkush et al. | |
| 4,994,076 A | 2/1991 | Guss | |
| 5,007,666 A | 4/1991 | Kyfes | |
| 5,195,664 A | 3/1993 | Rhea | |
| 5,215,227 A | 6/1993 | Farner | |
| 5,284,368 A | 2/1994 | Oetiker et al. | |
| 5,328,095 A | 7/1994 | Wickenhaver | |
| 5,381,961 A | 1/1995 | Evans et al. | |
| 5,397,034 A | 3/1995 | Wunsch | |
| 5,636,770 A | 6/1997 | Hachinohe et al. | |
| 5,934,519 A | 8/1999 | Kim et al. | 222/464.4 |
| 5,954,239 A | 9/1999 | Evans et al. | 222/464.4 |
| 5,979,715 A * | 11/1999 | Emrick | 222/464.4 |
| 6,003,906 A | 12/1999 | Fogarty et al. | 285/242 |
| 6,027,041 A | 2/2000 | Evans | 239/334 |
| 6,155,610 A | 12/2000 | Godeau et al. | 285/242 |
| 6,202,943 B1 | 3/2001 | Evans et al. | 239/333 |
| 6,257,792 B1 | 7/2001 | Read, Jr. | 403/16 |
| 6,267,415 B1 | 7/2001 | Frank | 285/255 |
| 6,394,319 B1 | 5/2002 | Pucillo | |
| 6,463,631 B2 | 10/2002 | Noda | |
| 6,837,404 B2 | 1/2005 | Torres et al. | |
| 2001/0022324 A1 | 9/2001 | Evans et al. | |
| 2003/0218030 A1 | 11/2003 | Torres et al. | |
| 2004/0056052 A1 | 3/2004 | Verzino | |

* cited by examiner

FLEXIBLE SUPPLY TUBE WITH WEIGHTING MECHANISM FOR USE IN SPRAY BOTTLES

This application claims benefit of 60/424,688 dated Nov. 8, 2002.

BACKGROUND OF THE INVENTION

1. Field of the Invention

Our invention is directed to spray bottles and similar containers from which fluids are drawn through a tube or the like and dispensed. More specifically, our invention is directed to an improved system for removing fluid from containers through flexible tubing. In the system, a weighted member is secured to the distal end of the flexible tubing such that the weighted member pulls the distal end of the tubing toward the lowest point of the container, even when the container is shifted, rotated, tilted, inverted, and the like. More specifically, our invention is directed to novel designs of weighting systems and clamps for securing such weighting systems to the flexible tubing.

2. Description of the Related Art

Traditional spray bottles include a container for holding a fluid, with a spraying mechanism secured to the opening of the container. The spraying mechanism is generally threadingly engaged with the opening of the container to prevent fluid, other than that being sprayed, from exiting the container. The spray is created when fluid from the bottle is forced through a spray nozzle on the spraying mechanism. The forced fluid is usually provided by a pump powered by a trigger controlled by a user's finger. The squeezing of the trigger causes the pump to draw fluid from the container through a tube extending down into the container. Such configurations are well known and an example of the same may be found in U.S. Pat. No. 5,009,342 (incorporated herein by reference).

Traditionally, the tube extending into the container is semi-rigid and extends to just above the bottom of the container so that an opening in the tube is suspended close to the bottom of the container. When the fluid level in the container diminishes, the container often must be held at a precise angle (or relative position in space) so that the opening in the end of the tube reaches the fluid. Once the fluid level drops even farther, a user may find that no positioning of the container will allow the opening of the tube to reach the remaining fluid.

To overcome these drawbacks, a flexible tube may be used in place of the semi-rigid tube. A flexible tube may be provided with a greater length so that the open end of the tube reaches into corners of the container, particularly when the container is tilted such that the remaining fluid pools in the corner. To aid the open end of the tube in reaching lower levels and corners of the container, a weight may be secured near the open end of the tube so that gravity pulls the weighted end of the tube through the fluid toward the lowest point in the container.

With this improved configuration, less of the fluid in the container is wasted. In addition, the spray bottle may be held at angles/positions (i.e., upside down, sideways, etc.) at which traditional spray bottles fail to work properly due to fluid pooling away from the open end of the semi-rigid tube.

Nevertheless, spray bottles utilizing flexible tubes also suffer from certain drawbacks. For instance, the fluids used in these containers are often cleaning solutions, which may have properties that cause the tubing to swell or become slippery. Those conditions may cause the weight to slip off the tubing, if those elements are not properly secured to each other. In addition, the weight may bang into the sides of the container causing unwanted noise and vibration. Also, if the size of both the weighting mechanism and the tube or the fluid intake nozzle secured thereto are not properly proportioned, the system will not achieve maximum efficiency for reaching small amounts of fluid pooling in the corners of containers.

Our invention overcomes these drawbacks by introducing novel weighting mechanisms and clamps for securing the flexible tubes to those weighting mechanisms.

SUMMARY OF THE INVENTION

Our invention is generally directed to a spray bottle having a container for holding fluids, a pumping mechanism for pumping the fluids from the container, a flexible tube for transporting the fluids from the container to the pumping mechanism, a weighting mechanism for weighting a distal end of the tube, and a retainer for clamping the tube to the weighting mechanism.

Generally, the pumping mechanism includes a spray nozzle for forming a fine spray using the fluid in the container, a pump for pumping the fluid through the spray nozzle and a trigger for controlling the pump. The flexible tube connects to the pumping mechanism at one end to provide fluid to the pump.

The weighting mechanism typically includes a head with an opening therethrough, preferably frustoconical in shape, for projecting into an opening in the distal end of the flexible tube, and a housing for supporting a weight. Also, a nozzle may project from the weighting mechanism in order to aid in reaching fluids to be supplied to the pump, the nozzle being in flow communication with the head (i.e., connected by a passage through which fluids may flow from an opening in the head to an opening in the nozzle).

The retainer can be one of many clamp designs that clamps the flexible tube to the weighting mechanism when the head is projected into the distal end of the tubing.

In a preferred embodiment, a spray bottle according to the invention includes a pump, flexible tubing, a housing, and a retainer. The pump is for pumping fluid to be sprayed from inside the spray bottle. The flexible tubing attaches to the pump and extends into the spray bottle. The flexible tubing is suitable for communicating fluid from the bottle to the pump. The housing attaches to a distal end of the flexible tubing. The housing preferably includes a head, a weight, and a nozzle. The head has an opening therethrough, and projects into the opening in the distal end of the flexible tubing. A separate weight may be contained in the housing so as to pull the distal end of the flexible tubing toward the lowest position in the spray bottle, as the spray bottle is shifted or rotated in space. Alternatively, the housing material may be of sufficient density or size that a separate weight is not necessary. The nozzle extends from an end of the housing, preferably opposing the end of the housing attached to the head (i.e., substantially opposite ends such that the nozzle and head may be aligned). An opening in the nozzle and the opening in the head are in flow communication. The retainer encircles a portion of a periphery of the flexible tubing, and clamps the flexible tubing against the head.

Another embodiment of the present invention is directed to a particular weighting mechanism for providing weight to a distal end of a length of flexible tubing used in communicating fluids from a container. The weighting mechanism includes a weighted housing, a head, and first and second retaining members. The housing may support a separate weight or be formed of a material that provides the necessary weight. The head is attached to the housing and has an opening formed therein. The head projects into an opening in the distal end of the flexible tubing. A nozzle may also be included with the housing. The nozzle may extend from an end of the housing, which is preferably substantially opposite to the end of the housing attached to the head. An opening in the nozzle and the opening in the head are in flow communication.

The first and second retaining members interlock with each other to clamp the flexible tubing against the head when the head is projected into the flexible tubing. Each of the first and second retaining members preferably includes a concave surface, and, when the first and second retaining members are interlocked with each other, the concave surfaces oppose each other so as to couple the flexible tubing while clamping the flexible tubing against the head.

We prefer that the concave surfaces of the first and second retaining members be formed in a semi-cylindrical shape. In that way, the semi-cylindrical shapes may be positioned to couple the flexible tube along a length thereof. We also prefer that each of the first and second retaining members includes a pair of flanges positioned on opposite sides of the concave surface. The flanges extend out from each retaining member in a direction substantially perpendicular to the longitudinal axis of the semi-cylindrical concave surface and extend along the retaining member in a manner substantially parallel with the longitudinal axis of the semi-cylindrical concave surface. Each of the flanges may include a detent or barb extending along a length of the flange (i.e., in the longitudinal direction of the concave surface or tubing). With this configuration, opposing sets of flanges may engage each other when the first and second retaining members are interlocked, such that, when biased together to clamp the flexible tubing, the detents on the opposing flanges engage each other to secure the first and second retaining members in the clamped position. In more preferred embodiments, the first and second retaining members are identical to each other.

We also prefer that the head have a frustoconical tip having an annular lip about a circumference of the frustoconical tip. In addition, the semi-cylindrical concave surfaces may have ribs formed thereon which extend in substantially circumferential directions. With the ribs, when the first and second retaining members clamp the flexible tubing against the head, which is projected into the opening of the flexible tubing, the ribs clamp the flexible tubing against the head at a position between the lip and the housing.

Yet another embodiment of the present invention is directed to another weighting mechanism for providing weight to a distal end of a length of flexible tubing used in communicating fluids from a container. The weighting mechanism includes a weighted housing, a head, and a retainer. The housing may support a separate weight or be formed of a material that provides the necessary weight. The head is attached to the housing and has an opening formed therein. The head preferably includes a frustoconical tip having an annular lip about a circumference of the frustoconical tip. The head projects into an opening in the distal end of the flexible tubing. The housing may also include a nozzle. The nozzle may extend from an end of the housing, which end is preferably substantially opposite to the end of the housing attached to the head. An opening in the nozzle and the opening in the head are in flow communication.

The retainer has an axially extending passage for receiving the flexible tubing. The axially extending passage has a plurality of fingers projecting from an inner surface of the passage, which are positioned to clamp the flexible tubing against the head when the head projects into the opening of the flexible tubing. When the retainer is positioned around said flexible tubing and the head is projected into the opening of the flexible tubing, the fingers clamp the flexible tubing against the head. When a frustoconical tip is used, the fingers clamp the head at a position between the lip and the housing.

Preferably, the retainer is substantially cylindrical in shape and has a circular rim at the far end from the housing, when assembled. That circular rim preferably has a diameter greater than any other position along the cylinder.

DETAILED DESCRIPTION OF THE INVENTION

Figure 1:
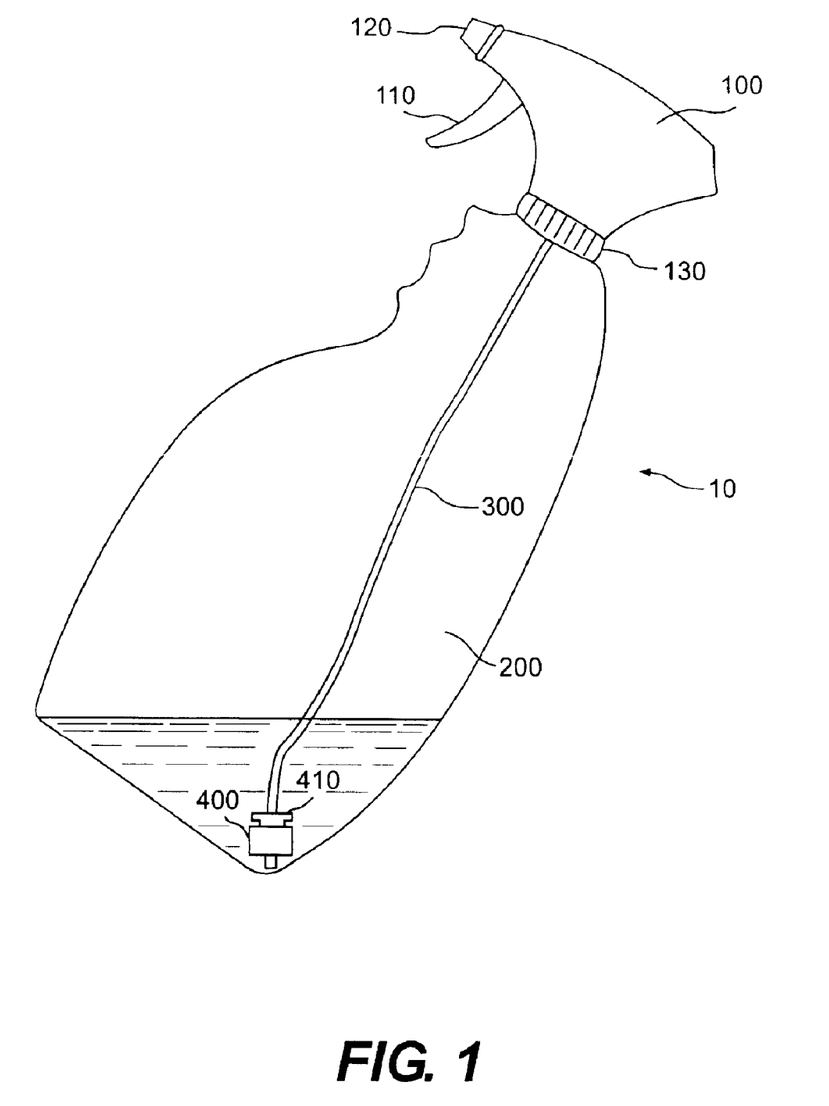
FIG. 1 is an elevational view of a spray bottle.

FIG. 1 shows a spray bottle 10 embodying one type of container to be used with our invention. Spray bottle 10 includes a pumping mechanism 100 and a container 200. While spray bottle 10 is the typical configuration in which the invention is to be embodied, other configurations may be substituted. Those various embodiments may include a wide range of containers from which fluid is to be drawn or pumped.

Pumping mechanism 100 includes a conventional pump operated by trigger 110. When trigger 110 is operated by a user, the pump draws fluid from inside the container and forces it through spray nozzle 120. Spray nozzle 120 creates a mist from the fluid pumped from the container. Pumping mechanism 100 is secured to container 200 by sealing member 130, which typically operates to threadingly engage container 200. These features, however, are known in the art and may be substituted with a number of alternative structures. In particular, spray bottle 10 may be a spray can operated by aerosol or a similar propulsion system.

As shown in FIGS. 1–4, attached to pumping mechanism 100 is a flexible tube 300. Tube 300 has a passage extending through its body, with the passage being in flow communication with pumping mechanism 100. Preferably, tube 300 is constructed from metallocene Linear Low Density Polyethylene (mLLDP), or other like materials, such that the tube is flexible. Flexible tubes fall and bend under the force of their own weight, such that the tubes are capable of moving from side to side and preferably up and down within the bottle (above or when suitably weighed) in response to the shifting, rotating, tilting, etc., of the bottle.

Figures 2, 3, 4:
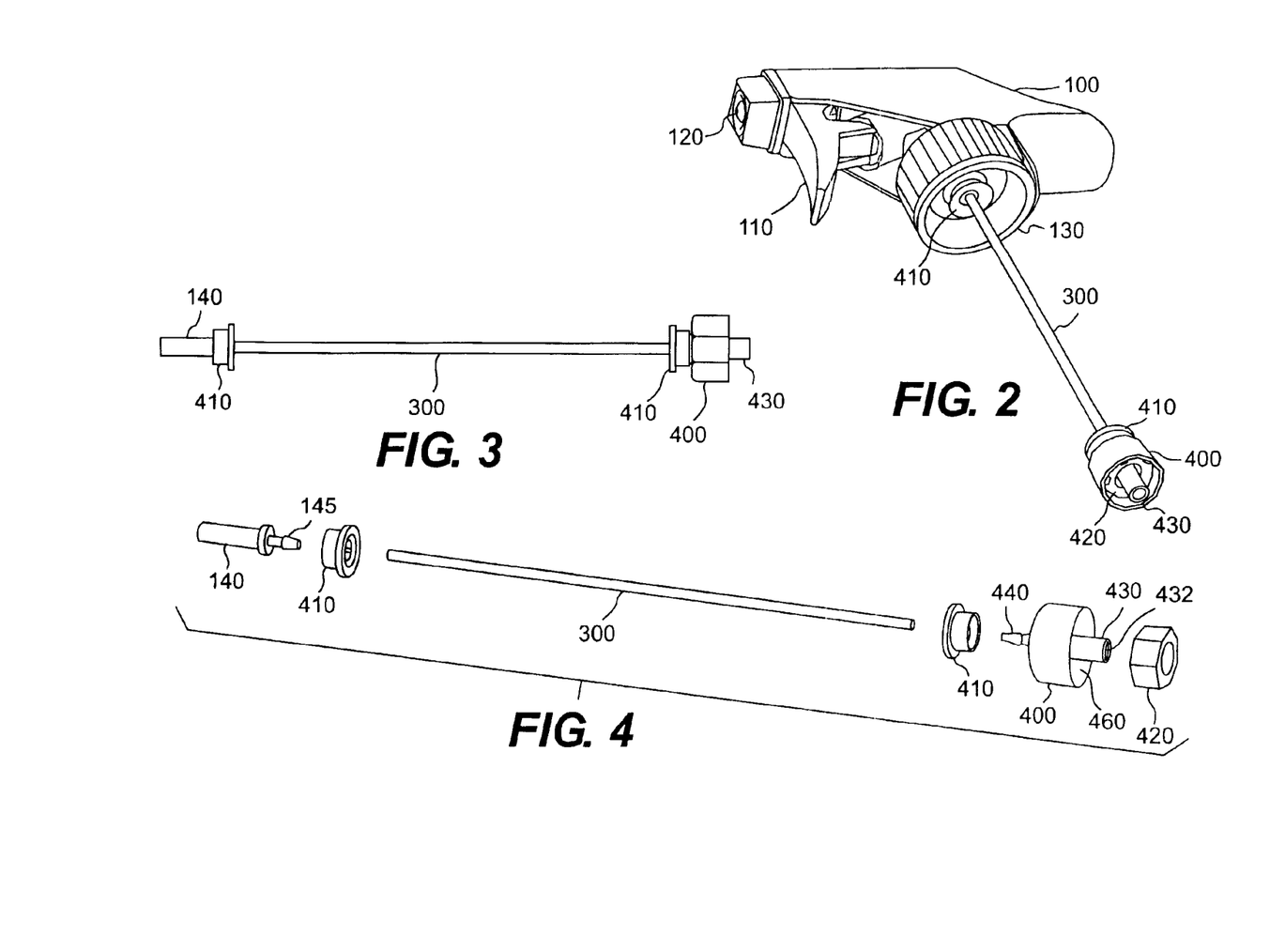
FIG. 2 is a perspective view of a spraying mechanism, flexible tube and weighting mechanism according to one aspect of our invention.
FIG. 3 is an elevational view of aspects of the invention shown in FIG. 2.
FIG. 4 a perspective, exploded view of the features shown in FIG. 3.
Figure 6:
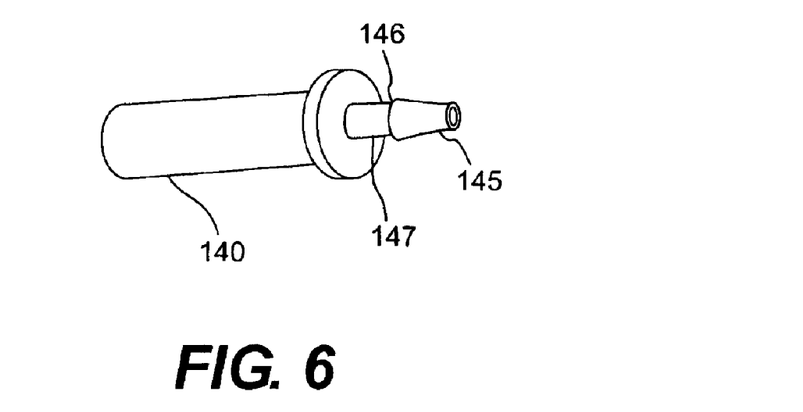
FIG. 6 is a perspective view of an adapter according to our invention.

Tube 300 is secured to pumping mechanism 100 by adapter 140 and one of the retainers 410. Adapter 140 is constructed to be removably securable to pumping mechanism 100 and to provide flow communication with tube 300. Adapter 140 may attach to pumping mechanism 100 through any conventional means so that adapter 140 remains secured to pumping mechanism 100 during normal use of spray bottle 10. Tube 300 may also be attached to adapter 140 through any one of a number of configurations. As shown in FIGS. 4 and 6, adapter 140 is provided with a frustoconical head 145, having shaft 147 and barbs 146, which project into tube 300. In other embodiments, the adapter may be combined with the pumping mechanism 100, or tube 300 may connect directly to the pumping mechanism 100 without the use of an adapter.

Retainer 410 clamps tube 300 on head 145 and shaft 147. Head 145 is similar in structure to head 440, also shown in FIG. 4. Accordingly, more detailed descriptions of that feature and of the second retainer 410 used in conjunction with head 440 are provided below with respect to embodiments of the invention for securing weighting mechanism 400 to tube 300. Retainer 410 and adapter 140 may be substituted with other head and retainer designs according to other aspects of the invention set forth below.

As shown in FIGS. 2–4, tube 300 is secured to weighting mechanism 400 using the other retainer 410. Specifically, head 440 of weighting mechanism 400 projects into the distal end of tube 300, providing flow communication between the passage through tube 300 and an opening in a passage through head 440. Retainer 410 clamps tube 300 securely onto head 440. Nozzle 430 extends from an opposite end of weighting mechanism 400 and has a passage 432 through its body which is in flow communication with the passage of head 440. The shape of weighting mechanism 400 and nozzle 430 define a ring-shaped opening 460 which provides a housing for storing a weight. When assembled, as shown in FIG. 2, weight 420, which in this embodiment is a hexagonal nut, is secured in the housing defined by opening 460.

Figure 5A:
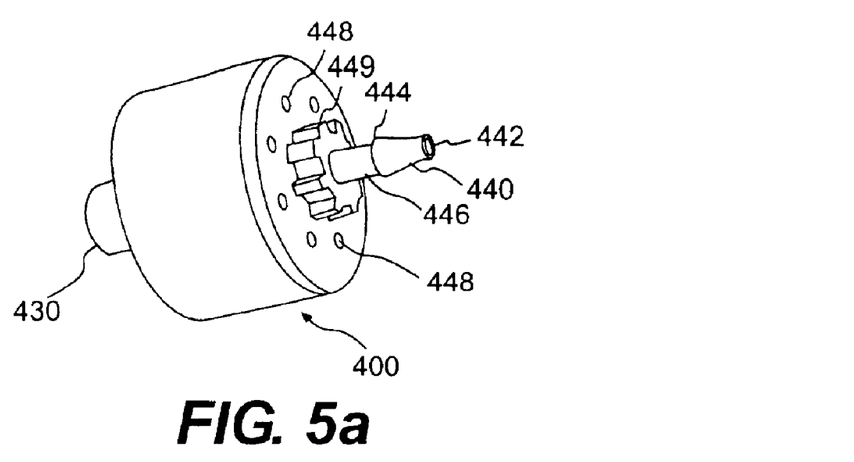
FIGS. 5a and 5b are perspective views of alternative weighting mechanisms according to our invention.
Figure 5B:
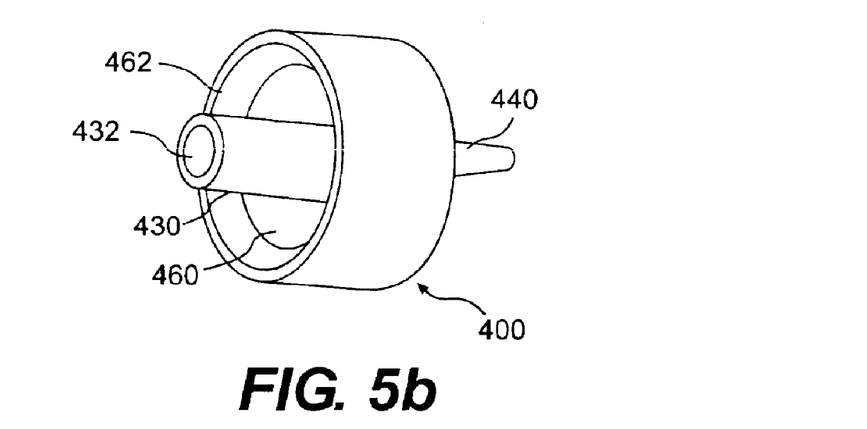

FIGS. 5a and 5b show weighting mechanism 400 in more detail. In particular, head 440 includes an opening 442, barb 444, shaft 446 and stop 449. Opening 442 allows for the flow of fluid from container 200 into tube 300. The frustoconical shape of head 440 terminates with barb 444. Barb 444 may by any detent, rim, lip, step, catch, or the like. In this embodiment, barb 444 is defined by an annular lip or step around a circumference of head 440. Barb 444 operates to catch tube 300 when head 440 is inserted in tube 300 and to impede tube 300 from being pulled off of head 440.

Shaft 446 extends from barb 444 to stop 449. Stop 449 interfaces with retainer 410 to ensure proper positioning of retainer 410. Retainer 410 may be positioned on tube 300 before head 440 is inserted in tube 300. Then, once tube 300 is in position on head 440, retainer 410 may be slid along tube 300 until it receives head 440. Alternatively, retainer 410 may be positioned on head 440 to interface with stop 449, prior to head 440 being inserted in tube 300. Once tube 300 is positioned on head 440, retainer 410 may then be slid backwards slightly over tube 300. It should be noted that, in many embodiments, stop 449 is not necessary. For instance, in the above-discussed example, a retainer 410 clamps tube 300 on adapter head 145 without the use of a stop.

It should also be realized that other shapes and configurations of head 440 may be employed while keeping within the scope of the invention. For instance, while frustoconical heads are preferred, simple shafts with locking or detent mechanisms may be used as well.

Weighting mechanism 400 also includes air holes 448, shown in FIG. 5a. Air holes 448 allow flow communication between the housing defined by opening 460 and the top of weighting mechanism 400. Thus, when weighting mechanism 400 is lowered into a fluid-filled container, air may escape through air holes 448. This prevents air from becoming trapped in the housing, which could cause weighting mechanism 400 to become buoyant.

As shown in FIG. 5b, nozzle 430 extends out from weighting mechanism 400. Nozzle 430 operates to receive the fluid from container 200, and it is in flow communication with opening 442 of head 440. The length of nozzle 430 may be varied depending on the dimensions of the container in which the invention is to be used. Preferably, the diameter of weighting mechanism 400 and length of nozzle 430 should work together to complement a container such that, when weighting mechanism 400 is drawn to a corner or crevice of the container, nozzle 430 may reach into the lowest point of the corner as the edges of weighting mechanism 400 (defined by its diameter) contact the sides of the container forming the corner. This allows for optimal performance of the system. Although the nozzle is not required to protrude outside weighting mechanism 400, in the most preferred embodiments, the length of nozzle 430 from its tip to the base of opening 460 of the housing is in the range of about 5 to about 25 mm, and the diameter of weighting mechanism 400 is in the range of about 10 to about 22 mm.

Also, nozzle 430 protrudes through the center of weight 420 (shown in FIG. 2). Annular lip 462 is formed around the base of opening 460 so that the lip projects inward. Annular lip 462 operates to retain weight 420 when it is snapped in place in opening 460.

Figure 7A:
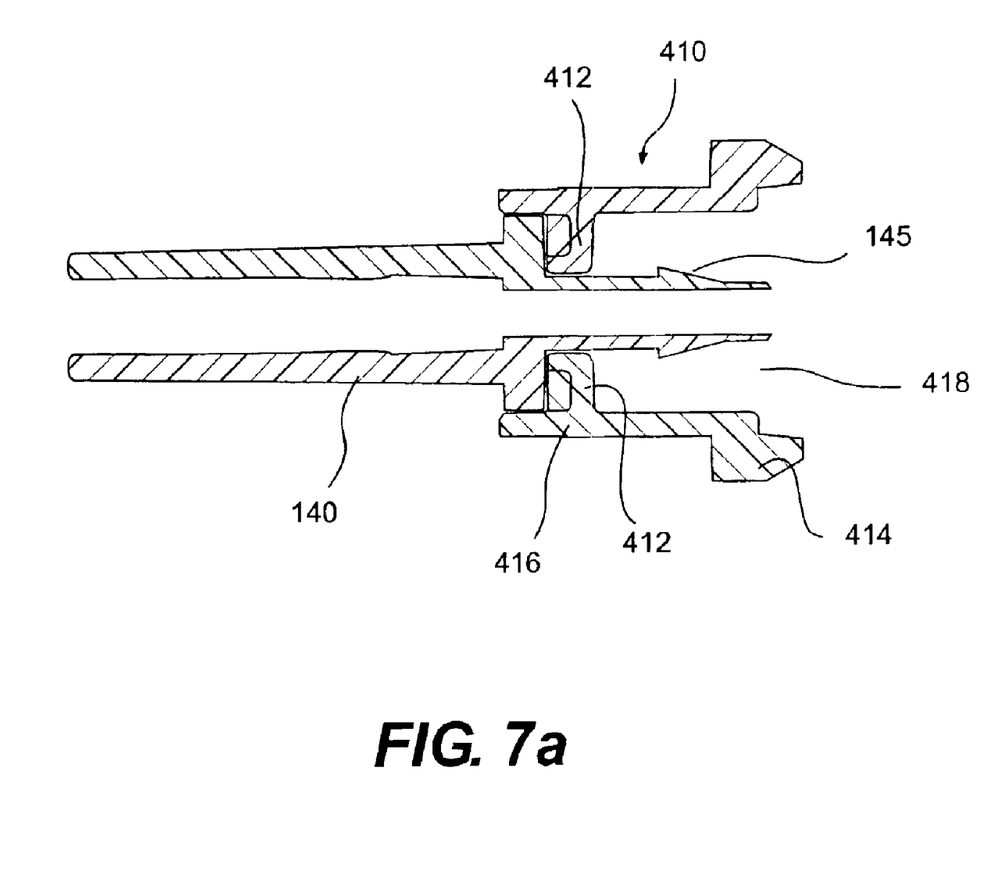
FIGS. 7a–7c include a cross-sectional view (FIG. 7a) and two perspective views (FIGS. 7b and 7c), of retainers according to our invention.
Figure 7B:
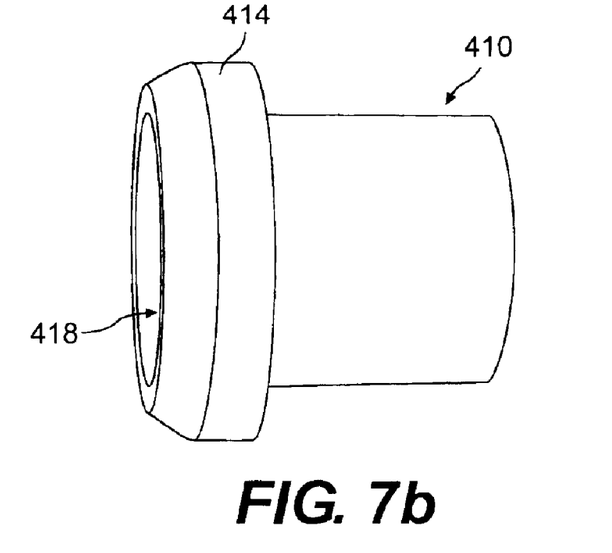
Figure 7C:
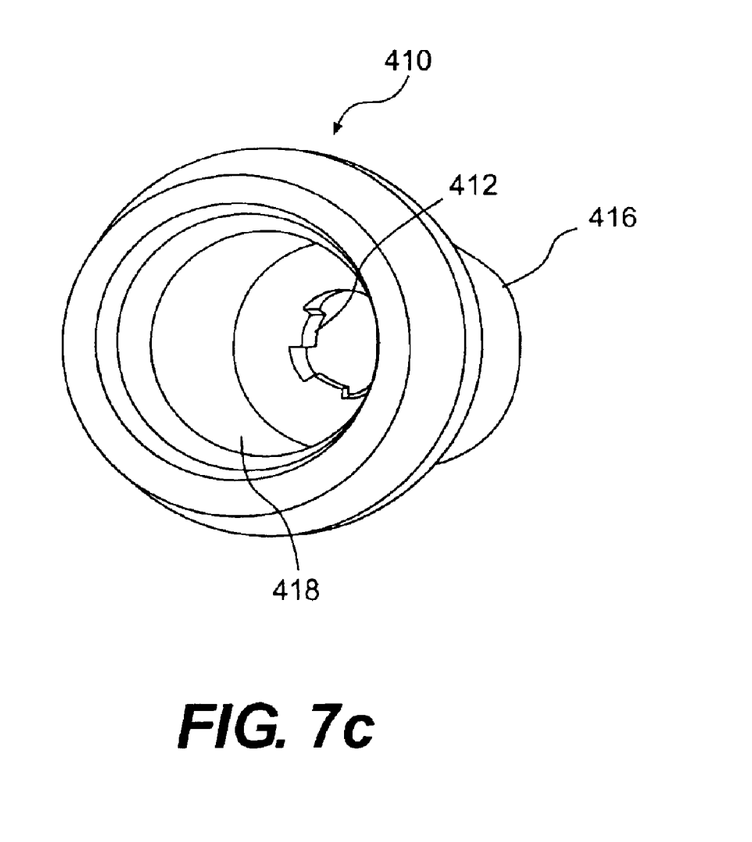

FIGS. 7a–7c show different views of typical retainers 410. As shown in FIG. 7a, retainer 410 includes a plurality of fingers 412. Fingers 412 are substantially L-shaped and extend from cylindrical wall 412 of retainer 410 toward a center axis of retainer 410. In this figure, fingers 412 are engaging frustoconical head 145 of adapter 140. But, as shown in FIG. 4, retainer 410 is also preferably used to secure weighting mechanism 400. FIGS. 7b and 7c show another retainer in which fingers 412 are substantially rectangular projections. Fingers 412 may take a number of additional forms while keeping with the intent and scope of the invention.

Wall 416 and fingers 412 define opening 418 through retainer 410. Opening 418 receives tube 300 and a head on which tube 300 is to be clamped.

As shown in FIG. 7c, fingers 412 are spaced along a circumference of wall 416. When clamped, tube 300 relaxes into the spaces between the fingers 412, which can accommodate swelling of tube 300. Fingers 412 press against tube 300 clamping it to head 145 or 440. Preferably, fingers 412 are made of propylene or a similar material, which provides slight flexibility to the fingers. Propylene is a preferred material for the elements of weighting mechanism 400 (although it is most preferred that weight 420 be a rust-resistant metal).

Retainer 410 also includes a ledge 414. Ledge 414 has proven useful in handling retainer 410 during the manufacture thereof and in positioning retainer 410 during assembly of spray bottle 10, particularly in connection with connecting adapter 140 and retainer 410 to pumping mechanism 100. Ledge 414 provides a greater diameter than the rest of retainer 410, and extends the length of retainer 410, which provides for the ease of handling and assembly.

Figure 8A:
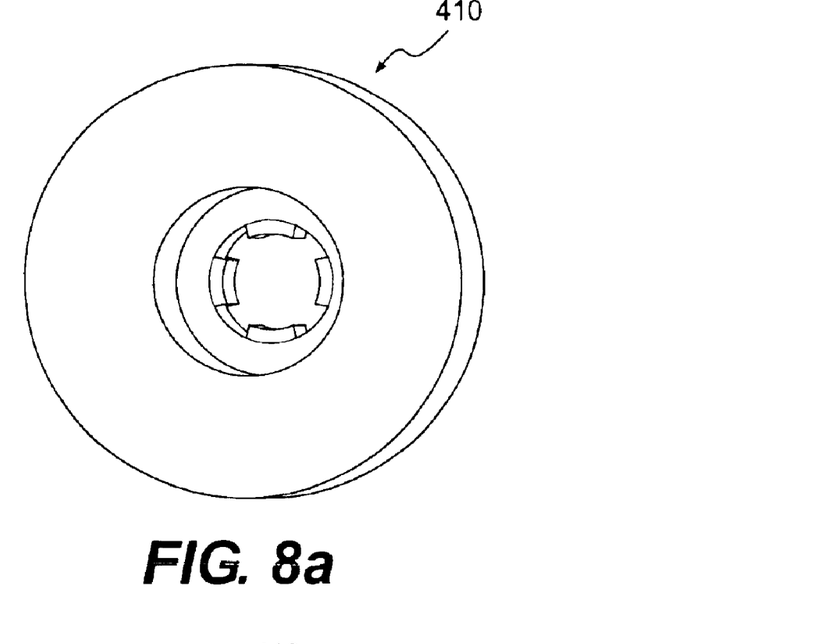
FIGS. 8a–8b are perspective views of another retainer according to our invention.
Figure 8B:
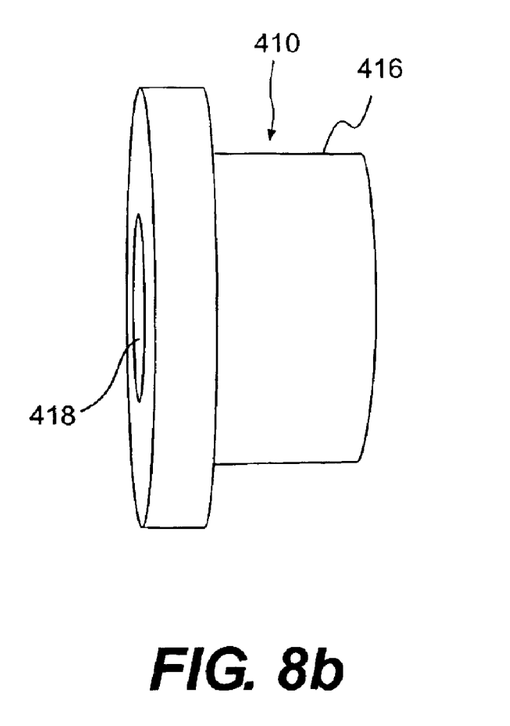

FIGS. 8a and 8b show another embodiment of retainer 410 in which ledge 414 is not provided.

Figure 9:
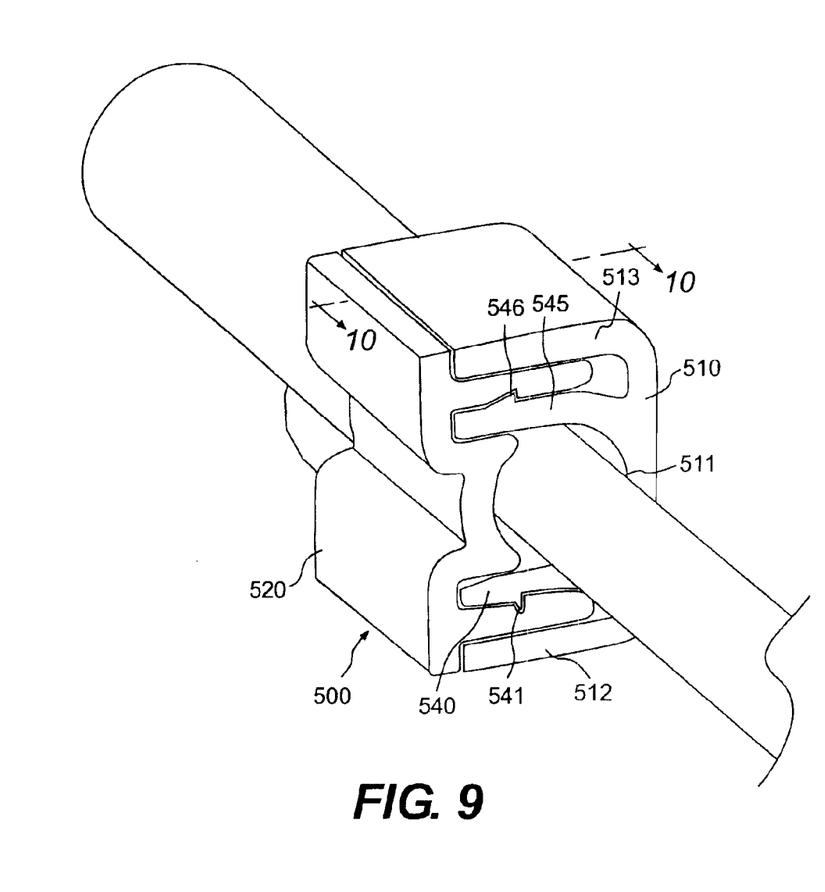
FIG. 9 is a perspective view of a two-piece retainer according to another embodiment of our invention.
Figure 10:
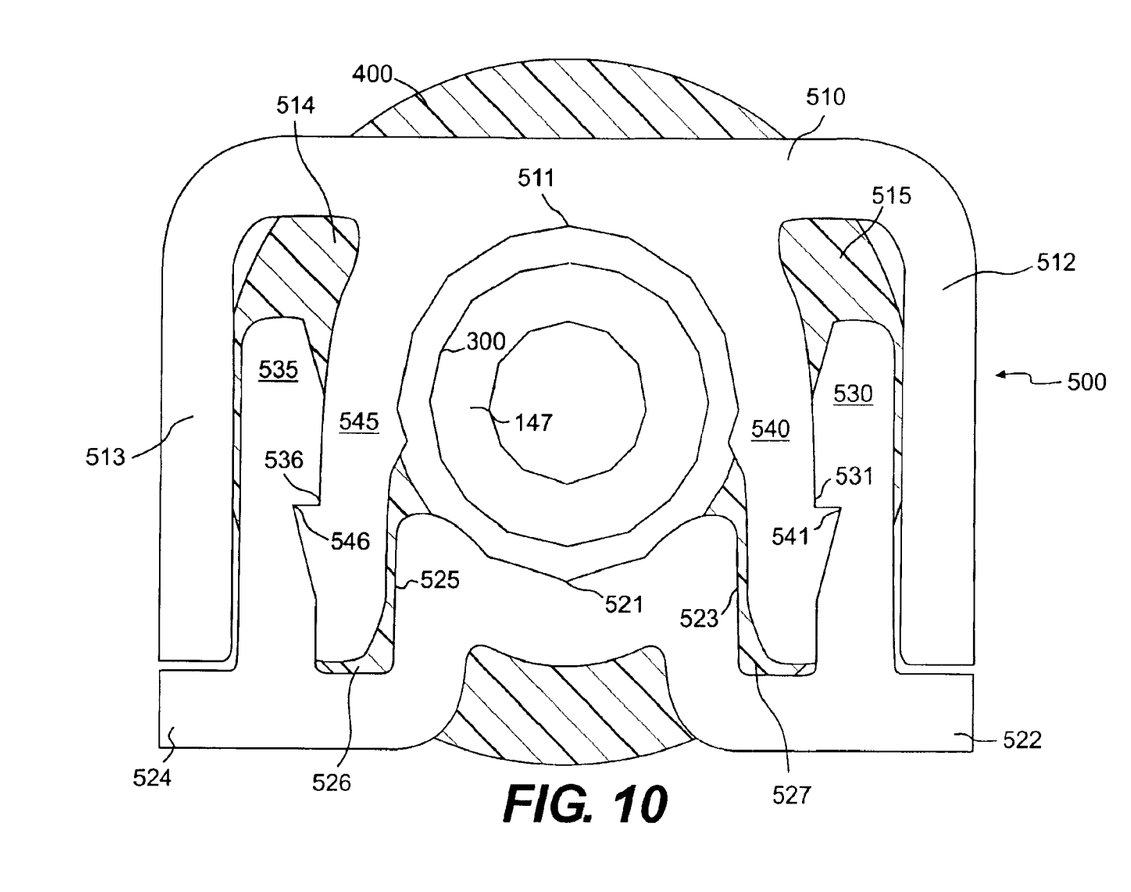
FIG. 10 is a cross-sectional view of the retainer shown in FIG. 9, taken along line A—A.
Figure 11:
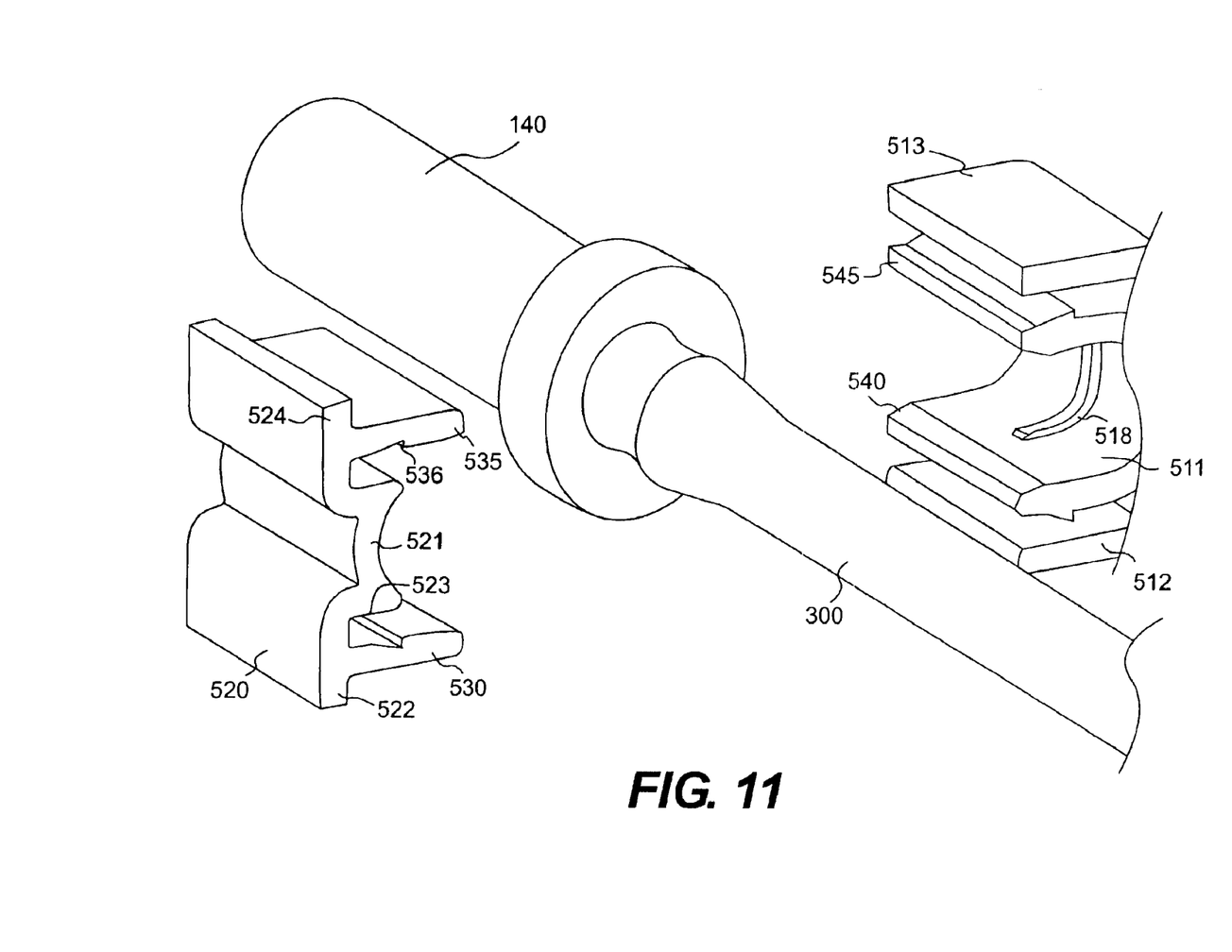
FIG. 11 is an exploded view of the retainer shown in FIG. 9.

FIGS. 9–11 show another embodiment of our invention in which a two-piece retainer 500 is used to clamp tube 300 to weighting mechanism 400 (or adapter 140). Two-piece retainer 500 includes first retaining member 510 and second retaining member 520.

As shown in FIGS. 9–11, second retaining member 520 includes a concave face 521, which, in this embodiment, is semi-cylindrical in shape. Flanges 530 and 535 are positioned on opposite sides of concave face 521. Preferably, flanges 530 and 535 are substantially parallel with each other and extend along second retaining member 520 in directions substantially parallel with the axis of the semi-cylindrical concave face 521. Flange 535 includes a detent 536, and flange 530 includes a detent 531. In this embodiment, each of detents 531 and 536 is formed by a lip extending along the length of the flange.

Walls 525 and 523 and flanges 535 and 530 form slots 526 and 527 therebetween, respectively. Abutments 524 and 522 extend from the bases of flanges 535 and 530 in directions away from slots 526 and 527, respectively.

First retaining member 510 includes concave face 511, which, in this embodiment, is also semi-cylindrical in shape. Flanges 545 and 540 are positioned on opposite sides of concave face 511. Preferably, flanges 545 and 540 are substantially parallel with each other and extend along first retaining member 510 in directions substantially parallel with the axis of the semi-cylindrical concave face 511. Flange 545 includes a detent 546, and flange 540 includes a detent 541. Similar to second retaining member 520, in this embodiment, each of detents 546 and 541 is formed by a lip extending along the length of the flange.

Walls 513 and 512 and flanges 545 and 540 form slots 514 and 515 therebetween, respectively.

When assembled, retainer 500 fits around tube 300 on head 145 or 440, such that concave faces 511 and 521 come into contact with tube 300 on opposing sides thereof. With this positioning, flanges 545 and 540 project into slots 526 and 527, respectively, and flanges 535 and 530 project into slots 514 and 515, respectively. This causes detents 536 and 546 to engage each other, and detents 541 and 531 to engage each other, along the lengths of their lips. The engagement and locking of the flanges biases concave surfaces 511 and 521 against tube 300, thereby clamping tube 300 against shaft 147 of head 145 (as shown) or shaft 446 of head 440.

As shown in FIG. 11, concave face 511 of first retaining member 510 includes rib 518. Rib 518 extends across a portion of concave face 511 in directions substantially perpendicular to the axis of the semi-cylindrical shape of concave face 511, or the axis of head 145 when assembled thereon. Rib 518 may interact with barb 146 of head 145 or barb 444 of head 440 to prevent the two-piece retainer 500 from sliding off head 145 or 440. A rib 518 may be similarly provided on concave face 521.

Figure 12:
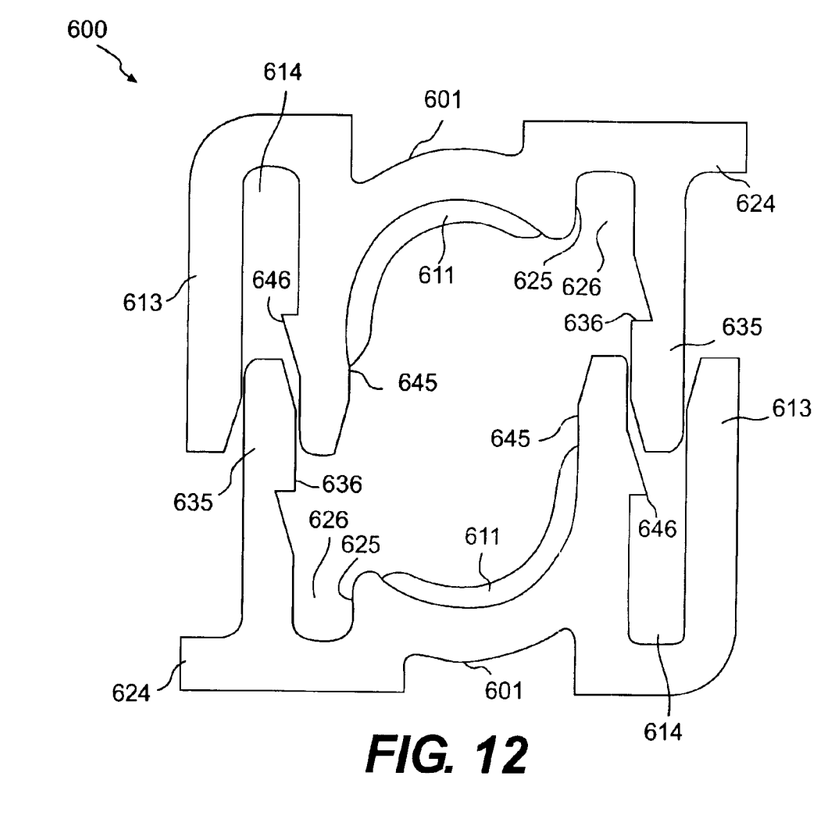
FIG. 12 is a front view of another two-piece retainer according to our invention.

FIG. 12 shows another two-piece retainer according to our invention. Two-piece retainer 600 includes two identical retaining members 601. By using identical retaining members 601, manufacturing costs are reduced, inasmuch as the number of molds needed to manufacture the retainers is reduced. Otherwise, the configuration and operation of retaining members 601 are fairly similar to those of retaining members 510 and 520.

As shown in FIG. 12, each retaining member 601 includes a concave face 611. Flanges 635 include detents 636. Walls 625 and flanges 635 form slots 626 therebetween. Abutments 624 extend from the bases of flanges 535.

Flanges 645 include detents 646. Flanges 645 and 635 are positioned on opposite sides of retaining members 601. Walls 613 and flanges 645 form slots 614 therebetween.

When assembled, retainer 600 fits around tube 300 on head 145 or 440, and their respective shafts, such that concave faces 611 of each retaining member 601 come into contact with tube 300 on opposing sides thereof. Thus, flanges 645 project into slots 626, and flanges 635 project into slots 614. This causes detents 636 and 646 to engage each other along their respective lengths. The engagement and locking of the flanges biases concave surfaces 611 against tube 300, thereby clamping tube 300 against head 145 or head 440.

The above-described embodiments are examples of preferred configurations for clamping flexible tubing on weighting mechanisms or adapters. These embodiments provide a superior weighting mechanism that is more secure than conventional weighting mechanisms, is cost effective, and protects the weight in a suitable housing. These examples, however, are not intended to be limiting. Many variations may be provided within these embodiments while still keeping with the scope of the claims. In particular, the exact structure, of the barbs, lips, flanges, heads, detents, and other such features, may be varied as necessary. It will be apparent to those skilled in the art that various changes and modifications may be made without departing from the spirit of the invention.

INDUSTRIAL APPLICABILITY

Our invention is applicable to containers in which flexible tubing is used to pump fluid therefrom. Further, our invention is applicable to manufacturing situations in which flexible tubing is to be securely weighted.

We claim:

1. A spray bottle comprising:
   a pump for pumping fluid in the spray bottle;
   a length of flexible tubing attached to the pump and extending into the spray bottle, the flexible tubing being suitable for communicating fluid from inside the spray bottle to the pump;
   a housing attached to a distal end of the flexible tubing, the housing comprising:
   (i) a head with an opening therein, the head projecting into an opening in the distal end of the flexible tubing,
   (ii) a weight secured in the housing, and
   (iii) a nozzle positioned in an end of the housing, wherein an opening in the nozzle and the opening in the head are in flow communication, and wherein the nozzle extends from the end of the housing; and
   a first retainer encircling a portion of the periphery of the flexible tubing, and clamping the flexible tubing against the head, and
   a second retainer encircling a portion of the periphery of an end of the flexible tubing opposite to the first retainer, and securing the flexible tube to be in flow communication with the pump.

2. The spray bottle according to claim 1, wherein the first retainer comprises first and second retaining members that interlock with each other to clamp the flexible tubing against the head.

3. The spray bottle according to claim 1, wherein the nozzle extends from the housing in a range of about 5 to about 25 mm.

4. The spray bottle according to claim 2, wherein each of the first and the second retaining members comprises a concave surface, and, when the first and second retaining members are interlocked with each other, the concave surfaces oppose each other so as to couple the flexible tubing while clamping the flexible tubing against the head.

5. The spray bottle according to claim 1, wherein the first and second retaining members are substantially identical to each other.

6. The spray bottle according to claim 5, wherein each of the first and second retaining members comprises an engaging surface, a flange and a slot, with the flange and slot being on opposing sides of the engaging surface, and wherein, when the first and second retaining members are interlocked with each other, the engaging surfaces oppose each other so as to clamp the flexible tubing against the head, and the flanges of the first and second retaining members engage the slots of the opposing retaining members.

7. The spray bottle according to claim 1, wherein each retainer comprises first and second retaining members that interlock with each other to clamp the flexible tubing.

8. The spray bottle according to claim 7, wherein each retaining member of the first and second retainers is substantially identical to each other retaining member of the first and second retainers.

9. The spray bottle according to claim 1, wherein:
(i) the retainer has an axially extending passage for receiving the flexible tubing, the axially extending passage having a plurality of fingers projecting from an inner surface of the passage,
(ii) the head comprises a shaft and a frustoconical tip having an annular lip about a circumference of the frustoconical tip, and
(iii) when the retainer is positioned around the flexible tubing and the frustoconical tip is projected into the opening of the flexible tubing, the fingers clamp the tubing against the shaft.

10. A weighting mechanism for providing weight to a distal end of a length of flexible tubing used in communicating fluids from a container, the weighting mechanism comprising:
a weighted housing;
a head, attached to the housing and having an opening formed therein, for projecting into an opening in the distal end of the flexible tubing; and
first and second retaining members that interlock with each other to clamp the flexible tubing against the head when the head is projected into the flexible tubing,
wherein the housing includes a reversibly detachable weight supported in the housing, and
wherein the weighting mechanism further comprises a nozzle extending from an end of the housing, with an opening in the nozzle and the opening in the head being in flow communication.

11. The weighting mechanism according to claim 10, wherein the first and second retaining members are substantially identical to each other.

12. The weighting mechanism according to claim 10, wherein each of the first and second retaining members comprises an engaging surface, a flange and a slot, with the flange and slot being on opposite sides of the engaging surface, and wherein, when the first and second retaining members are interlocked with each other, the engaging surfaces oppose each other so as to clamp the flexible tubing against the head, and the flanges of the first and second retaining members engage the slots of the opposing retaining members.

13. The weighting mechanism according to claim 12, wherein the first and second retaining members are substantially identical to each other.

14. The weighting mechanism according to claim 10, wherein the nozzle extends from the housing in a range of about 5 to about 25 mm.

15. The weighting mechanism according to claim 10, wherein each of the first and second retaining members comprises a concave surface, and, when the first and second retaining members are interlocked with each other, the concave surfaces oppose each other so as to couple the flexible tubing while clamping the flexible tubing against the head.

16. The weighting mechanism according to claim 10, wherein:
(i) each of the first and second retaining members comprises an engaging surface, and, when the first and second retaining members are interlocked with each other, the engaging surfaces oppose each other so as to clamp the flexible tubing against the head,
(ii) each of the first and second retaining members further comprises a pair of flanges positioned on opposite sites of the engaging surface, with the opposing flanges extending along lengths of the retaining members, and with each of the flanges comprising a detent extending along the flange, and
(iii) the detents of the corresponding flanges on the first and second retaining members engage each other when biased together to clamp the flexible tubing.

17. The weighting mechanism according to claim 16, wherein
(i) the head comprises a frustoconical tip having an annular lip about a circumference of the frustoconical tip,
(ii) each engaging surface has a rib formed thereon, and
(iii) when the first and second retaining members clamp the flexible tubing and the head is projected into the opening of the flexible tubing, the ribs clamp the flexible tubing against the head at a position between the lip and the housing.

* * * * *